US012264823B1

(12) United States Patent
Athani et al.

(10) Patent No.: US 12,264,823 B1
(45) Date of Patent: Apr. 1, 2025

(54) LED LIGHT GUIDE DESIGN TO ENABLE INSTALLATION OF LED BAR TO LED REFLECTOR IN A COOKING APPLIANCE

(71) Applicant: WHIRLPOOL CORPORATION, Benton Harbor, MI (US)

(72) Inventors: Murgyappa Mahadev Athani, Jat Sangli (IN); Omkar Bharat Jadhav, Pune (IN); Wojciech Adam Pawlowski, Wroclaw (PL)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/529,400

(22) Filed: Dec. 5, 2023

(51) Int. Cl.

| | |
|---|---|
| ***F24C 15/00*** | (2006.01) |
| ***F21V 7/00*** | (2006.01) |
| ***F21V 7/04*** | (2006.01) |
| ***F21V 17/14*** | (2006.01) |
| ***F21W 131/307*** | (2006.01) |
| ***F21Y 115/10*** | (2016.01) |

(52) U.S. Cl.
CPC .......... *F24C 15/008* (2013.01); *F21V 7/0016* (2013.01); *F21V 17/14* (2013.01); *F21V 7/043* (2013.01); *F21V 2200/15* (2015.01); *F21W 2131/307* (2013.01); *F21Y 2115/10* (2016.08)

(58) Field of Classification Search
CPC .............. F24C 15/008; F21V 33/0044; F21W 2131/307
See application file for complete search history.

(56) References Cited

U.S. PATENT DOCUMENTS

| | | | |
|---|---|---|---|
| 8,636,372 B2 | 1/2014 | Reinhard-Herrscher et al. | |
| 9,857,513 B2 * | 1/2018 | Yang .................... | G02B 6/0006 |
| 10,408,464 B2 | 9/2019 | Lee et al. | |
| 11,156,758 B2 | 10/2021 | Baumeister et al. | |
| 11,168,890 B2 | 11/2021 | Henrici et al. | |
| 2018/0128494 A1 * | 5/2018 | Signorino ............. | F24C 15/008 |
| 2018/0324907 A1 | 11/2018 | Bar et al. | |
| 2021/0127885 A1 | 5/2021 | Baumeister et al. | |
| 2024/0248246 A1 * | 7/2024 | Henrici .................. | G02B 6/001 |

FOREIGN PATENT DOCUMENTS

| | | |
|---|---|---|
| DE | 202021100376 U1 | 2/2021 |
| DE | 202022101873 U1 | 4/2022 |
| EP | 4130579 A1 | 2/2023 |
| EP | 4206544 A1 | 7/2023 |

* cited by examiner

*Primary Examiner* — William N Harris
(74) *Attorney, Agent, or Firm* — Price Heneveld LLP

(57) ABSTRACT

A lighting system is provided for illuminating a cooking cavity in a cooking appliance. The lighting system includes a light guide rod configured to guide an illumination and a reflective element optically coupled to the light guide rod for reflecting the illumination from the light guide rod toward the cooking cavity. A guide for insertion of the light guide rod extends longitudinally between an insertion end and a reflective element connection end coupled to the reflective element. The guide defines an inner surface that is tapered, becoming narrower from the insertion end towards the reflective element connection end, for guiding the light guide rod during optical coupling with the reflective element.

20 Claims, 6 Drawing Sheets

LED LIGHT GUIDE DESIGN TO ENABLE INSTALLATION OF LED BAR TO LED REFLECTOR IN A COOKING APPLIANCE

BACKGROUND OF THE DISCLOSURE

The present disclosure generally relates to a lighting system for illuminating a cooking cavity in a cooking appliance. More particularly, the present disclosure relates to a guide to facilitate installation of the lighting system in the cooking appliance.

SUMMARY OF THE DISCLOSURE

According to one aspect of the present disclosure, a lighting system is provided for illuminating a cooking cavity in a cooking appliance. The lighting system includes a light guide rod configured to guide an illumination and a reflective element optically coupled to the light guide rod for reflecting the illumination from the light guide rod toward the cooking cavity. A guide for insertion of the light guide rod extends longitudinally between an insertion end and a reflective element connection end coupled to the reflective element. The guide defines an inner surface that is tapered, becoming narrower from the insertion end towards the reflective element connection end, for guiding the light guide rod during optical coupling with the reflective element.

According to another aspect of the present disclosure, a cooking appliance with a lighting system includes an outer shell and an inner shell at least partially surrounded by the outer shell and defining a space therebetween. The inner shell has an inner surface defining a cooking cavity. A lighting assembly is located between the inner shell and the outer shell. The lighting assembly includes a lighting module configured to generate an illumination and a light guide rod optically coupled to the lighting module and configured to guide the illumination. A reflective element is aligned with and facing a reflective aperture defined by the inner shell. The reflective element is optically coupled to the light guide rod for reflecting the illumination from the light guide rod through the reflective aperture and into the cooking cavity. A guide for insertion of the light guide rod extends longitudinally between an insertion end and a reflective element connection end coupled to the reflective element. The guide defines a plurality of hooks that are inserted into a plurality of slots defined by at least one of the inner shell or the outer shell.

According to yet another aspect of the present disclosure, a cooking appliance with a lighting system includes an outer shell at least partially defining an assembly aperture and an inner shell at least partially surrounded by the outer shell and defining a space therebetween. The inner shell has an inner surface defining a cooking cavity. A lighting assembly is located between the inner shell and the outer shell. The lighting assembly includes a lighting module configured to generate an illumination. A light guide rod is optically coupled to the lighting module and configured to guide the illumination. A reflective element is aligned with and facing a reflective aperture defined by the inner shell. The reflective element is optically coupled to the light guide rod for reflecting the illumination guided from the light guide rod through the reflective aperture and into the cooking cavity. A guide for insertion of the light guide rod extends longitudinally between an insertion end and the reflective element connection end, the insertion end aligned with the assembly aperture in the outer shell.

These and other features, advantages, and objects of the present disclosure will be further understood and appreciated by those skilled in the art by reference to the following specification, claims, and appended drawings.

Figure 1:
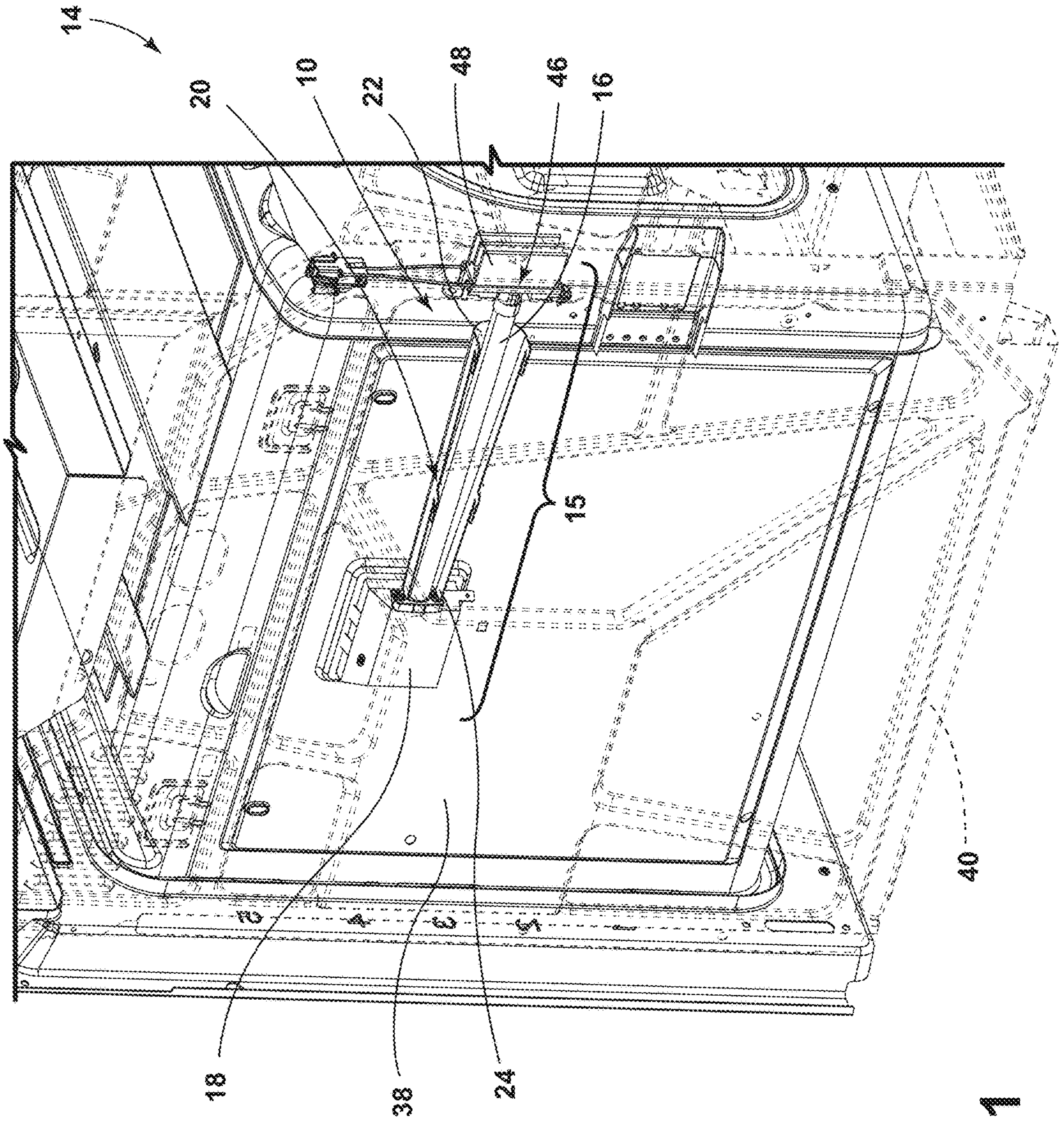
FIG. 1 is a top perspective view of a cooking appliance, the cooking appliance including a lighting system, in accordance with an aspect of the present disclosure.

The components in the figures are not necessarily to scale, emphasis instead being placed upon illustrating the principles described herein.

DETAILED DESCRIPTION

The present illustrated embodiments reside primarily in a lighting system for illuminating a cooking cavity in a cooking appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Figure 2:
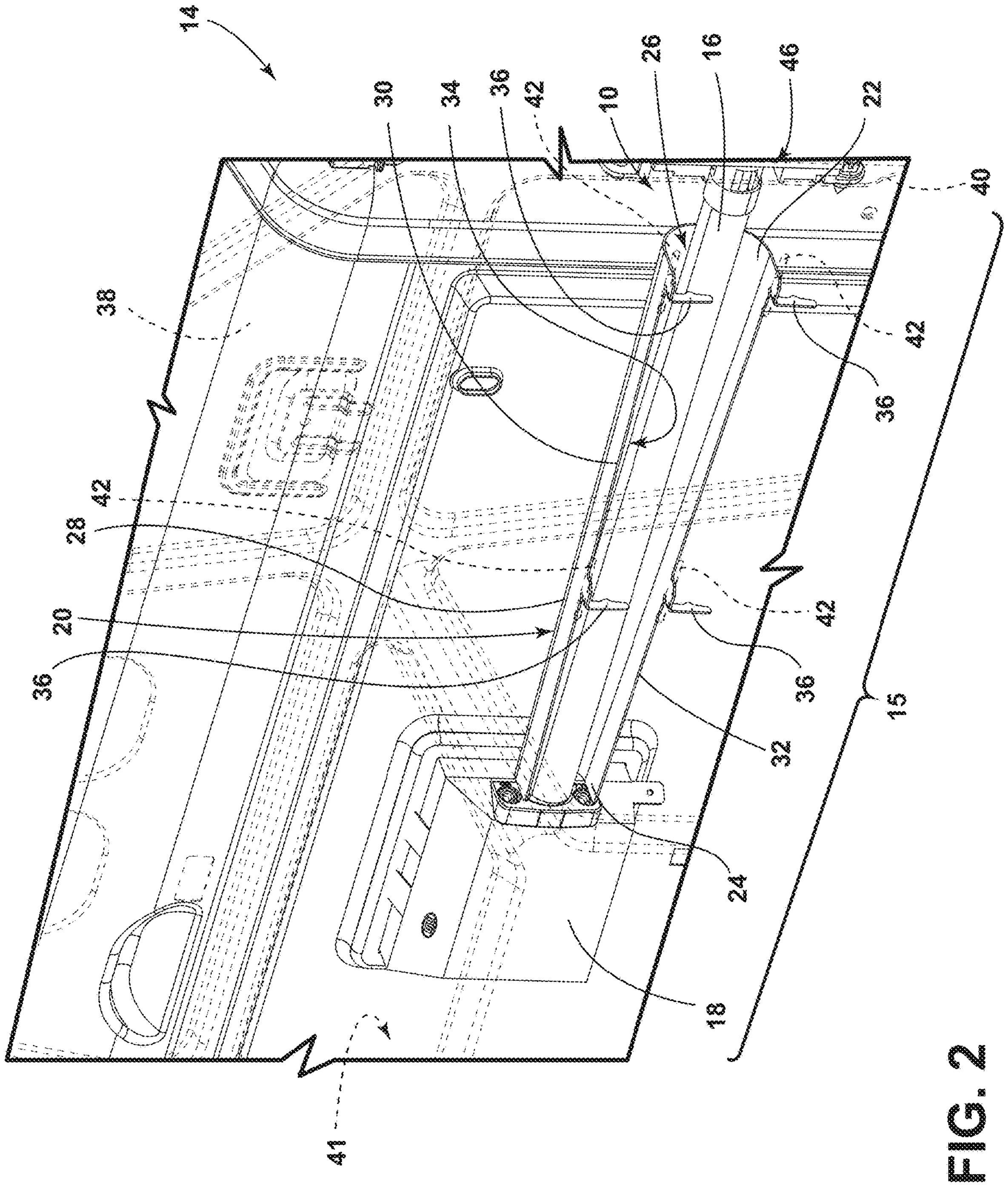
FIG. 2 is an enlarged top perspective view of a lighting system of a cooking assembly, in accordance with an aspect of the present disclosure.
Figure 3:
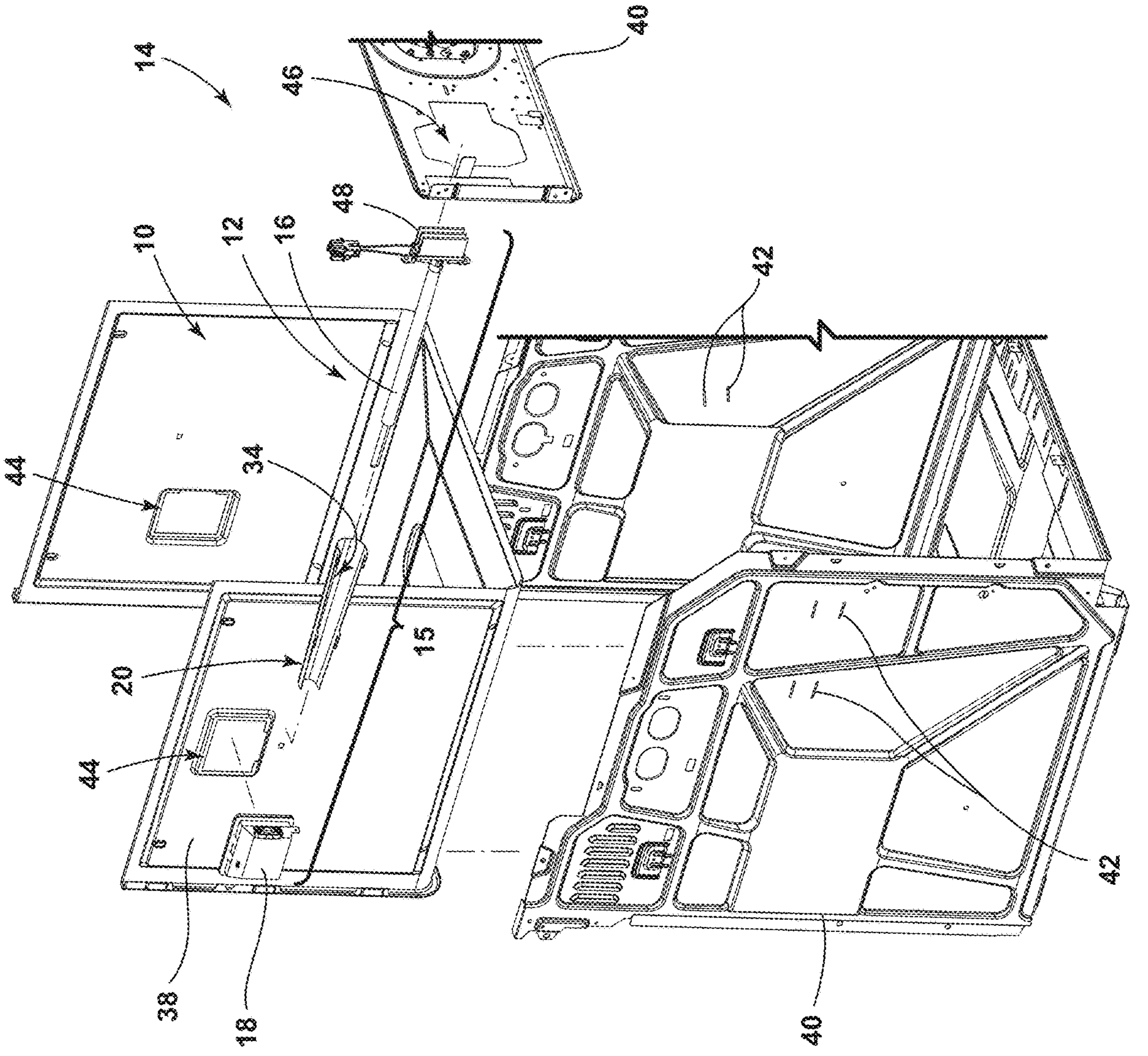
FIG. 3 is a top perspective view of a cooking appliance in a disassembled state, the cooking appliance including a lighting system, in accordance with an aspect of the present disclosure.

Referring initially to FIGS. 1-3, reference numeral 10 generally designates a lighting system 10 for illuminating a cooking cavity 12 in a cooking appliance 14. The lighting system 10 includes a lighting assembly 15 that has a light guide rod 16 configured to guide an illumination and a reflective element 18 optically coupled to the light guide rod 16 for reflecting the illumination from the light guide rod 16 toward the cooking cavity 12. A guide 20 for insertion of the light guide rod 16 extends longitudinally between an insertion end 22 and a reflective element connection end 24 coupled to the reflective element 18. The guide 20 defines an inner surface 26 that is tapered, becoming narrower from the insertion end 22 towards the reflective element connection end 24, for guiding the light guide rod 16 during optical coupling with the reflective element 18.

With continued reference to FIGS. 1-3, the guide 20 defines a curved body 28 extending longitudinally between the insertion end 22 and the reflective element connection end 24. More particularly, the inner surface 26 of the curved body 28 extends laterally between a first guide edge 30 and a second guide edge 32 that defines an open face 34. In this manner, the curved body 28 generally defines a C-shaped cross-sectional profile. The C-shaped cross-sectional profile may be defined as any shape exhibiting a curved inner surface 26. In some embodiments, the curved inner surface 26 may be arched (e.g., exhibiting a smooth arch that extends about a continuous or variable radius) or polygonal (e.g., a curved shape defined by a series of planar or variable curved segments). While the first guide edge 30 is illustrated as being an upper edge, it should be appreciated that unless otherwise explicitly stated, terms first guide edge 30 and second guide edge 32 may be used interchangeably to refer to either the upper or lower edges.

Figure 4:
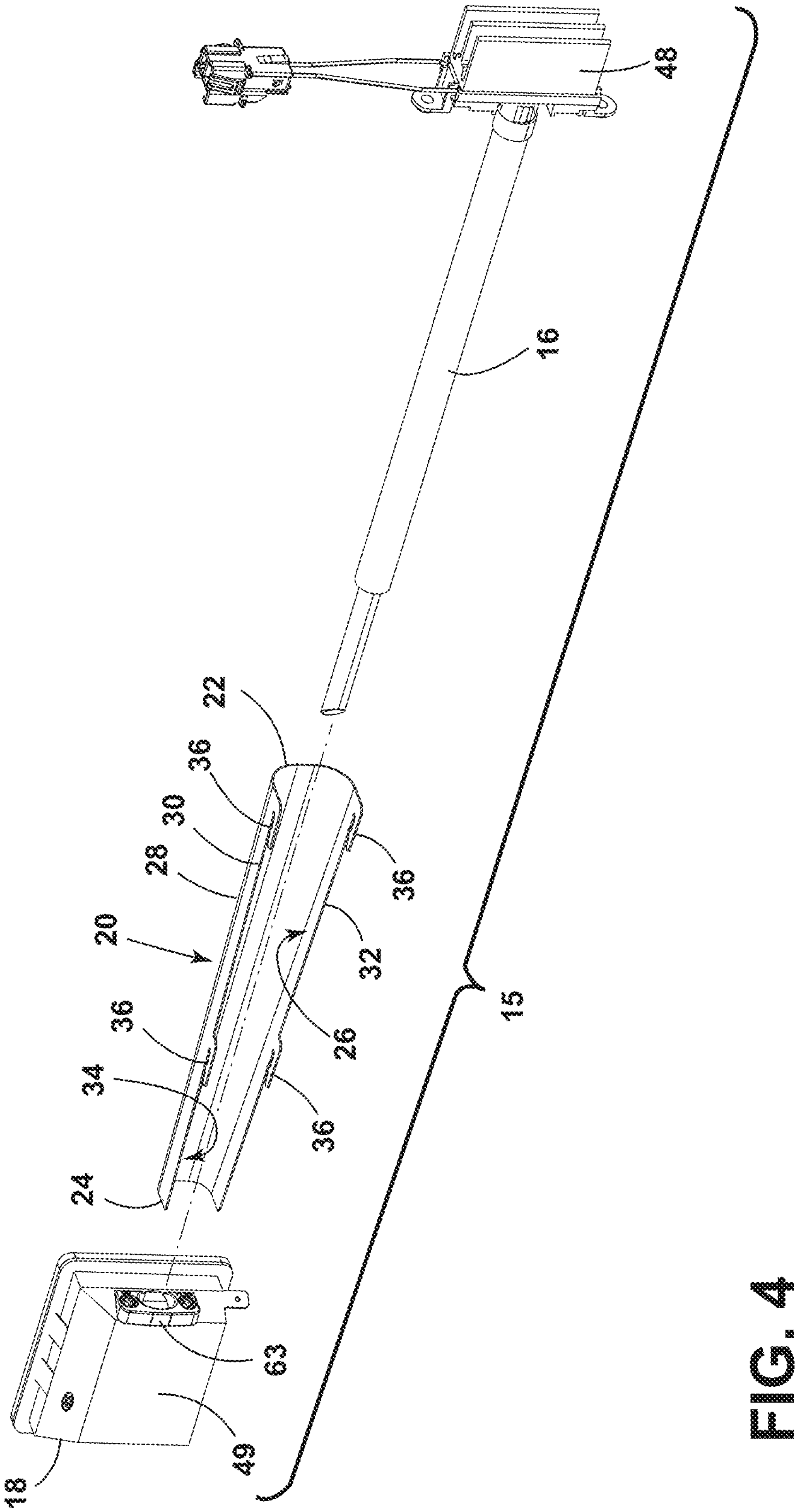
FIG. 4 is a top perspective view of a lighting assembly in a partially disassembled state, in accordance with an aspect of the present disclosure.

With reference now to FIGS. 3-4, the guide 20 may further include at least one hook 36 extending from the first guide edge 30 and/or the second guide edge 32. The at least one hook 36 may include a plurality of hooks 36 located on the first guide edge 30 and a plurality of hooks 36 located on the second guide edge 32. The hooks 36 are configured to connect to a cooking appliance 14. More particularly, the cooking appliance 14 includes an outer shell 40 and an inner shell 38 that is at least partially surrounded by the outer shell 40. A space 41 is defined between the inner shell 38 and the outer shell 40. In some embodiments, the lighting assembly 15 is located in the space 41 between the inner shell 38 and the outer shell 40. At least one of the inner shell 38 and the outer shell 40 defines a plurality of slots 42 (FIG. 3) that are each configured to connect with different ones of the hooks 36. In some embodiments, the hooks 36 are configured to be bent into engagement with the outer shell 40 after the hooks 36 have been inserted into the slots 42 (FIG. 2). In some embodiments, the inner shell 38 defines a reflective aperture 44 and the reflective element 18 is aligned with and faces the reflective aperture 44. In some embodiments, the outer shell 40 or the inner shell 38 at least partially defines an assembly aperture 46 aligned with the space 41. The insertion end 22 of the guide 20 is aligned with the assembly aperture 46. In this manner, the light guide rod 16 and the guide 20 can be easily installed through the assembly aperture 46. As best depicted in FIG. 3, the cooking appliance 14 may be configured to include a pair of lighting assemblies 15 located on the same, opposite, or transverse sides of the cooking cavity 12. Each lighting assembly 15 may have the same configuration as the lighting assembly 15 depicted in FIGS. 1-6. Regardless of the number of lighting assemblies 15, in some embodiments, each lighting assembly (e.g., one or more) is generally located near a rear side of the cooking appliance 14, which is typically the coolest part of the cooking appliance 14 surrounding a muffle (not shown).

Figure 5:
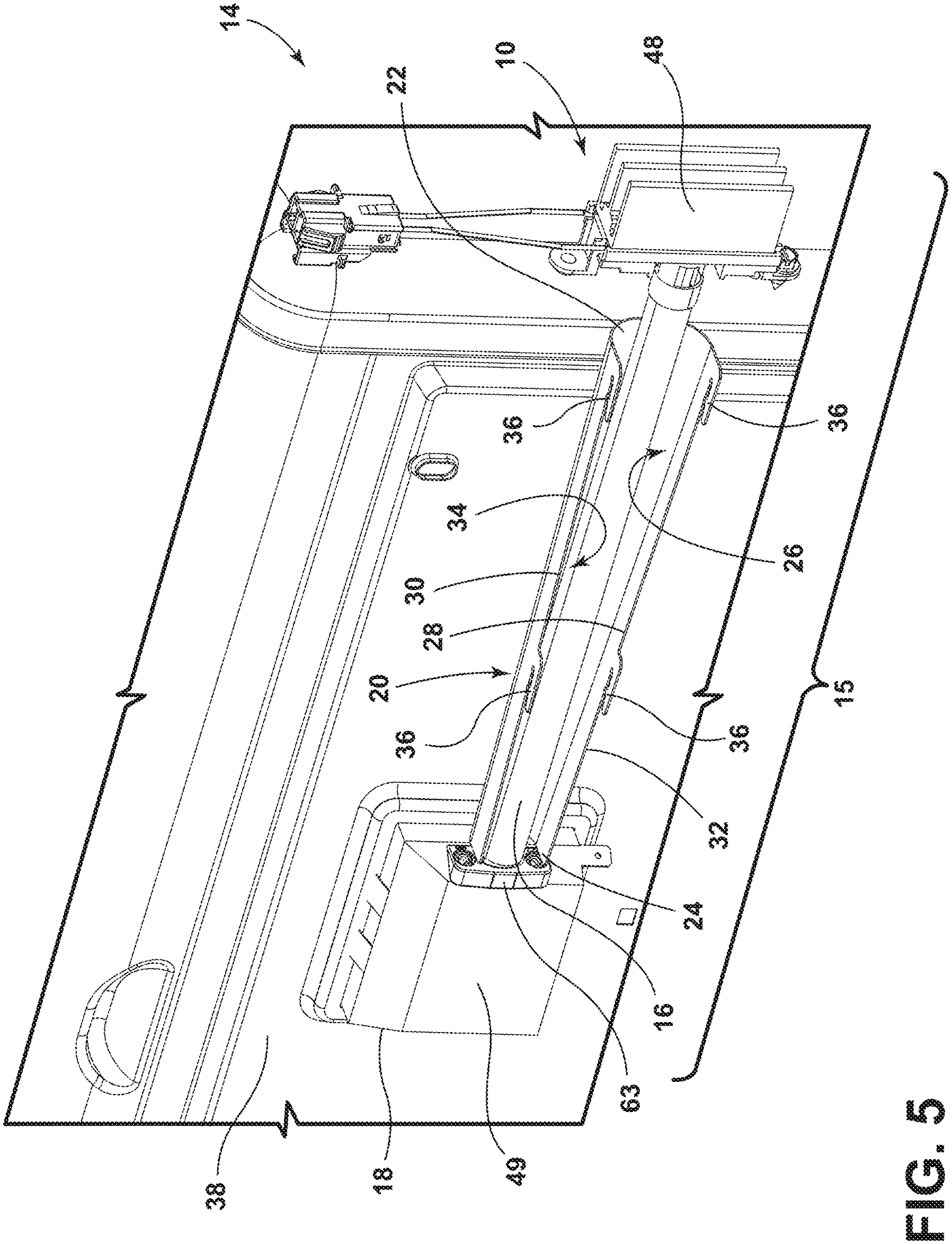
FIG. 5 is an enlarged top perspective view of a cooking appliance with an outer shell removed, the cooking appliance including a lighting system, in accordance with an aspect of the present disclosure.

With reference now to FIGS. 4-5, the lighting assembly 15 may further include a lighting module 48 configured to generate the illumination. The lighting module 48 is optically coupled to the light guide rod 16. In operation, the lighting module 48 generates the illumination and the illumination is guided by the light guide rod 16 to the reflective element 18, whereat the illumination is reflected through the reflective aperture 44 and into the cooking cavity 12. The reflective element 18 may include a housing 49 that includes an opaque outer surface and a reflective inner surface. In some embodiments, the lighting module 48 includes at least one LED (light-emitting diode) (e.g., a plurality of LEDS). In some embodiments, the lighting module 48 may be located on an exterior surface of the outer shell 40 for easy access. In other embodiments, the lighting module 48 may be located in the space 41 between the inner shell 38 and the outer shell 40 for protecting the lighting module 48 from objects exterior to the cooking appliance 14.

Figure 6:
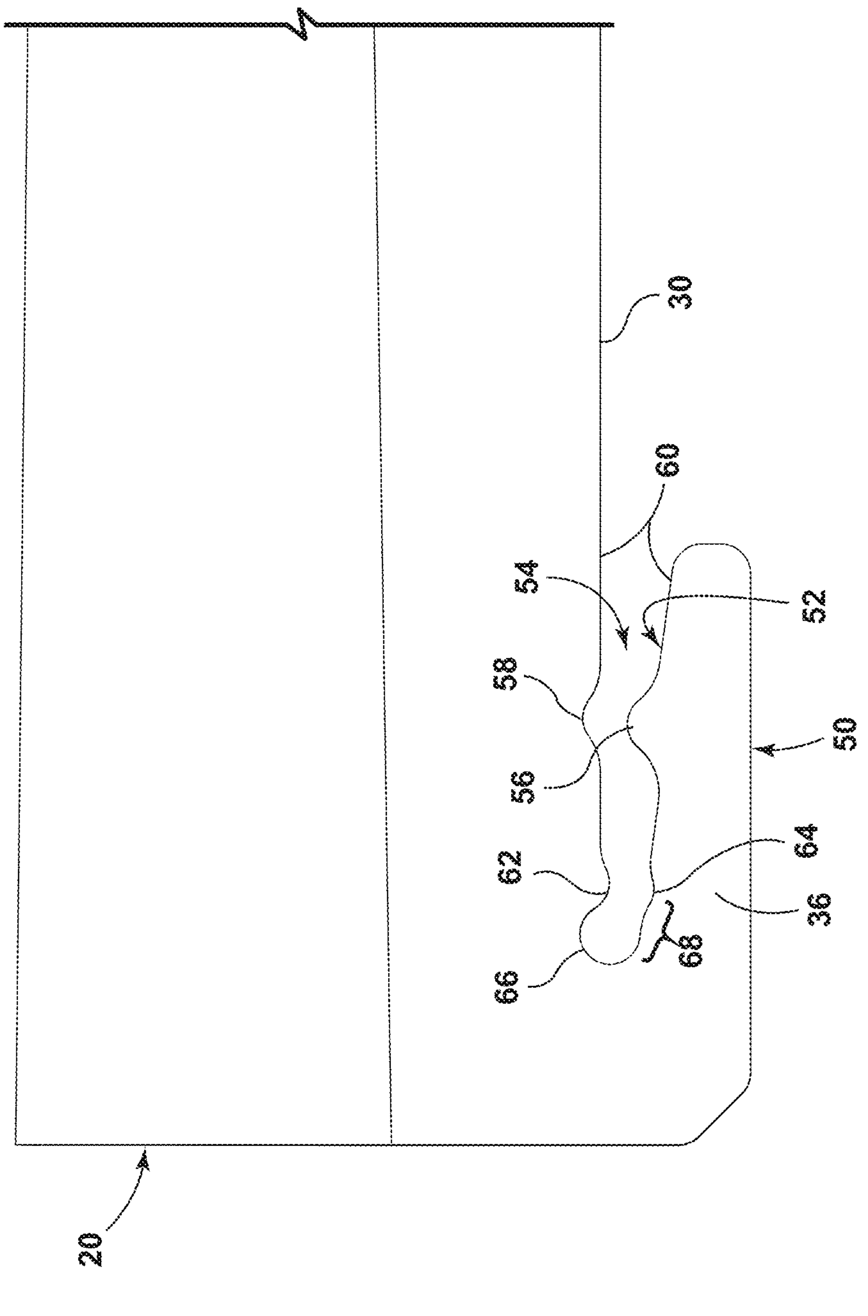
FIG. 6 is an enlarged plane view of a hook in a guide for a lighting assembly, in accordance with an aspect of the present disclosure.

With reference now to FIG. 6, each hook 36 defines an outer hook edge 50 and an inner hook edge 52, the inner hook edge 52 faces and is spaced from the first guide edge 30 and/or second guide edge 32 to define a connection channel 54. During connection, the hooks 36 enter the slots 42 in the outer shell 40 and the guide 20 is moved until the outer shell 40 is within the connection channel 54 of each hook 36. The hooks 36 may all be generally extended longitudinally in a same direction between the insertion end 22 and the reflective element connection end 24 such that the hooks 36 can be inserted into the slots 42 via linear movement. In some embodiments, each of the inner hook edges 52 define a hook protrusion 56 that extends towards the first guide edge 30 and the second guide edge 32, respectively. The hook protrusions 56 are configured to pinch the outer shell 40 during connection. The first guide edge 30 and the second guide edge 32 may define a guide bay 58 aligned with the hook protrusion 56. In some embodiments, a spacing between the hook protrusion 56 and the guide bay 58 is less than regions of the hook 36 and first guide edge 30 proximate both sides of the hook protrusion 56 and guide bay 58. In some embodiments, the hook protrusion 56 and the guide bay 58 have rounded profiles that act as a wedge. In this manner, the outer shell 40 is wedged along the hook protrusion 56 as it is pushed into the connection channel 54.

Still referring to the exemplary hook 36 depicted in FIG. 6, each hook 36 at least partially defines an insertion mouth 60 that tapers inwardly towards the hook protrusion 56. More particularly, the insertion mouth 60 is a section of the connection channel 54 that the outer shell 40 first enters and the taper facilitates alignment and insertion of the outer shell 40 during installation. In this manner, the guide 20 may be installed onto the outer shell 40 through with linear movement. Each insertion mouth 60 may open generally in the same direction, e.g., towards the reflective element connection end 24 to facilitate installation by linear movement.

In some embodiments, each of the first guide edge 30 and the second guide edge 32 may define a guide protrusion 62 that extends towards the inner hook edges 52. The guide protrusion 62 is configured to pinch the outer shell 40 during connection. In some embodiments, the guide 20 may be installed through the assembly aperture 46. However, as depicted, the housing 49 of the reflective element 18 may include a connection section 63 (FIG. 4) that includes apertures for connection to the guide 20 via fasteners, pins (e.g., integral or non-integral), and/or the like. In this manner, the reflective element 18 and the guide 20 may be installed during the assembly of the inner shell 38 and the outer shell 40. Regardless of how and when the reflective element 18 and the guide 20 are installed, the guide 20 allows the light guide rod 16 to be installed, removed, and/or serviced without any disassembly of other components. More particularly, the light guide rod 16 may be inserted or removed from the assembly aperture 46 defined by the outer shell 40. Because the inner surface 26 is tapered and becomes narrower from the insertion end 22 towards the reflective element connection end 24, the light guide rod 16 can be installed and optically coupled with the reflective element 18 in low visibility conditions.

Still referring to the exemplary hook 36 depicted in FIG. 6, the inner hook edges 52 may define a hook bay 64 aligned with the guide protrusion 62. In this manner, the hook protrusion 56 and the guide protrusion 62 impart pressure on opposite sides of the outer shell 40 to facilitate connection of the guide 20 during installation. In some embodiments, the connection channel 54 may extend from the insertion mouth 60 to a terminal end 66. A tail segment 68 may extend between the hook bay 64 and the guide protrusion 62 to the terminal end 66. The connection channel 54 may define a centerline between the inner hook edge 52 and the first guide edge 30 and the second guide edge 32, respectively. The centerline in the tail segment 68 may be angled relative to a centerline in the rest of the connection channel 54, not accounting for the hook protrusion 56, the guide protrusion 62, the guide bay 58, or the hook bay 64. In this manner, the tail segment 68 may act as a further wedging component as the outer shell 40 reaches the terminal end 66 of the connection channel 54. In some embodiments, the tail segment 68 extends towards the guide 20 (e.g., into the curved body 28).

With reference now to FIGS. 1-6, while the slots 42 are depicted as being defined by the outer shell 40, it should be appreciated that the slots 42 may alternatively be defined by the inner shell 38. In this manner, the disclosure related to the connection between the outer shell 40 and the guide 20 can also be applied to a connection between the inner shell 38 and the guide 20. It should further be appreciated that, for purposes of this disclosure, the cooking appliance 14 may include any type of cooking appliance that has a cooking cavity. For example, the cooking appliance 14 may be configured as an oven, a microwave, a toaster oven, and other types of heating appliances without departing from the scope of the subject disclosure.

The disclosure herein is further summarized in the following paragraphs and is further characterized by combinations of any and all of the various aspects described therein.

According to one aspect of the present disclosure, a lighting system is provided for illuminating a cooking cavity in a cooking appliance. The lighting system includes a light guide rod configured to guide an illumination and a reflective element optically coupled to the light guide rod for reflecting the illumination from the light guide rod toward the cooking cavity. A guide for insertion of the light guide rod extends longitudinally between an insertion end and a reflective element connection end coupled to the reflective element. The guide defines an inner surface that is tapered, becoming narrower from the insertion end towards the reflective element connection end, for guiding the light guide rod during optical coupling with the reflective element.

According to another aspect, a guide defines a curved body extending longitudinally between an insertion end and a reflective element connection end.

According to yet another aspect, an inner surface of a curved body extends laterally between a first guide edge and a second guide edge that define an open face, the curved body generally defining a C-shaped cross-sectional profile.

According to still yet another aspect, at least one hook extends from a first guide edge and is configured to connect to a cooking appliance.

According to another aspect, at least one hook defines an outer hook edge and an inner hook edge, the inner hook edge facing and spaced from a first guide edge to define a connection channel.

According to yet another aspect, an inner hook edge defines a hook protrusion that extends towards a first guide edge and is configured to pinch a component of a cooking appliance during connection.

According to still yet another aspect, a first guide edge defines a guide bay aligned with a hook protrusion.

According to another aspect, a spacing between a hook protrusion and a guide bay is less than regions of an inner hook and a first guide edge proximate both sides of a hook protrusion and guide bay.

According to another aspect of the present disclosure, a cooking appliance with a lighting system includes an outer shell and an inner shell at least partially surrounded by the outer shell and defining a space therebetween. The inner shell has an inner surface defining a cooking cavity. A lighting assembly is located between the inner shell and the outer shell. The lighting assembly includes a lighting module configured to generate an illumination and a light guide rod optically coupled to the lighting module and configured to guide the illumination. A reflective element is aligned with and facing a reflective aperture defined by the inner shell. The reflective element is optically coupled to the light guide rod for reflecting the illumination from the light guide rod through the reflective aperture and into the cooking cavity. A guide for insertion of the light guide rod extends longitudinally between an insertion end and a reflective element connection end coupled to the reflective element. The guide defines a plurality of hooks that are inserted into a plurality of slots defined by at least one of the inner shell or the outer shell.

According to another aspect, a plurality of slots are defined by an outer shell.

According to yet another aspect, each of a plurality of hooks extend longitudinally in a direction between an insertion end and a reflective element connection end.

According to still yet another aspect, a guide rod defines an inner surface that is tapered, becoming narrower from an insertion end towards a reflective element connection end, for guiding a light guide rod during optical coupling with a reflective element.

According to another aspect, a guide defines a curved body that extends laterally between a first guide edge and a second guide edge that define an open face.

According to yet another aspect, a plurality of hooks extend from both a first guide edge and a second guide edge.

According to still yet another aspect, a plurality of hooks extending from a first guide edge are longitudinally aligned with a plurality of hooks extending from a second guide edge. According to another aspect, a plurality of hooks each define an outer hook edge and an inner hook edge, the inner hook edge facing and spaced from a respective one of a first guide edge and a second guide edge to define a plurality of connection channels.

According to yet another aspect, an outer shell defines a plurality of slots and each of a plurality of inner hook edges define a hook protrusion that extends towards a first guide edge and a second guide edge respectively, the hook protrusions configured to pinch an outer shell during connection.

According to yet another aspect of the present disclosure, a cooking appliance with a lighting system includes an outer shell at least partially defining an assembly aperture and an inner shell at least partially surrounded by the outer shell and defining a space therebetween. The inner shell has an inner surface defining a cooking cavity. A lighting assembly is located between the inner shell and the outer shell. The lighting assembly includes a lighting module configured to generate an illumination. A light guide rod is optically coupled to the lighting module and configured to guide the illumination. A reflective element is aligned with and facing a reflective aperture defined by the inner shell. The reflective element is optically coupled to the light guide rod for reflecting the illumination guided from the light guide rod through the reflective aperture and into the cooking cavity. A guide for insertion of the light guide rod extends longitudinally between an insertion end and the reflective element connection end, the insertion end aligned with the assembly aperture in the outer shell.

According to another aspect, a guide defines a plurality of hooks that are inserted into a plurality of slots defined by at least one of an inner shell or an outer shell, each of the hooks define an insertion mouth that tapers inwardly towards a protrusion that extends towards a guide, each protrusion defines a rounded profile.

According to yet another aspect, a lighting module includes at least one LED.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A lighting system for illuminating a cooking cavity in a cooking appliance, comprising:
- a light guide rod configured to guide an illumination;
- a reflective element optically coupled to the light guide rod for reflecting the illumination from the light guide rod toward the cooking cavity; and
- a guide for insertion of the light guide rod extending longitudinally between an insertion end and a reflective element connection end coupled to the reflective element, the guide defining an inner surface that is tapered, becoming narrower from the insertion end towards the reflective element connection end, for guiding the light guide rod during optical coupling with the reflective element.

2. The lighting system of claim 1, wherein the guide defines a curved body extending longitudinally between the insertion end and the reflective element connection end.

3. The lighting system of claim 2, wherein the inner surface of the curved body extends laterally between a first guide edge and a second guide edge that define an open face, the curved body generally defining a C-shaped cross-sectional profile.

4. The lighting system of claim 3, further including at least one hook extending from the first guide edge and configured to connect to the cooking appliance.

5. The lighting system of claim 4, wherein the at least one hook defines an outer hook edge and an inner hook edge, the inner hook edge facing and spaced from the first guide edge to define a connection channel.

6. The lighting system of claim 5, wherein the inner hook edge defines a hook protrusion that extends towards the first guide edge configured to pinch a component of the cooking appliance during connection.

7. The lighting system of claim 6, wherein the first guide edge defines a guide bay aligned with the hook protrusion.

8. The lighting system of claim 7, wherein a spacing between the hook protrusion and the guide bay is less than regions of the inner hook edge and the first guide edge proximate both sides of the hook protrusion and the guide bay.

9. A cooking appliance with a lighting system, comprising:
- an outer shell;

an inner shell at least partially surrounded by the outer shell and defining a space therebetween, the inner shell having a shell inner surface defining a cooking cavity; and a lighting assembly located between the inner shell and the outer shell and including:

a lighting module configured to generate an illumination;

a light guide rod optically coupled to the lighting module configured to guide the illumination;

a reflective element aligned with and facing a reflective aperture defined by the inner shell, the reflective element optically coupled to the light guide rod for reflecting the illumination from the light guide rod through the reflective aperture and into the cooking cavity; and a guide for insertion of the light guide rod extending longitudinally between an insertion end and a reflective element connection end coupled to the reflective element, the guide defining a plurality of hooks that are inserted into a plurality of slots defined by at least one of the inner shell or the outer shell.

10. The cooking appliance of claim 9, wherein the slots are defined by the outer shell.

11. The cooking appliance of claim 9, wherein the hooks each extend longitudinally in a direction between the insertion end and the reflective element connection end.

12. The cooking appliance of claim 9, wherein the guide rod defines an inner surface that is tapered, becoming narrower from the insertion end towards the reflective element connection end, for guiding the light guide rod during optical coupling with the reflective element.

13. The cooking appliance of claim 9, wherein the guide defines a curved body that extends laterally between a first guide edge and a second guide edge that define an open face.

14. The cooking appliance of claim 13, wherein the plurality of hooks extend from both the first guide edge and the second guide edge.

15. The cooking appliance of claim 14, wherein the hooks extending from the first guide edge are longitudinally aligned with the hooks extending from the second guide edge.

16. The cooking appliance of claim 14, wherein each hook defines an outer hook edge and an inner hook edge, the inner hook edge facing and spaced from a respective one of the first guide edge and the second guide edge to define a plurality of connection channels.

17. The cooking appliance of claim 16, wherein the outer shell defines the plurality of slots and each of the inner hook edges define a hook protrusion that extends towards the first guide edge and the second guide edge respectively, the hook protrusions configured to pinch the outer shell during connection.

18. A cooking appliance with a lighting system, comprising:

an outer shell at least partially defining an assembly aperture;

an inner shell at least partially surrounded by the outer shell and defining a space therebetween, the inner shell having an inner surface defining a cooking cavity; and a lighting assembly located between the inner shell and the outer shell and including:

a lighting module configured to generate an illumination;

a light guide rod optically coupled to the lighting module configured to guide the illumination;

a reflective element aligned with and facing a reflective aperture defined by the inner shell, the reflective element optically coupled to the light guide rod for reflecting the illumination guided from the light guide rod through the reflective aperture and into the cooking cavity; and a guide for insertion of the light guide rod extending longitudinally between an insertion end and a reflective element connection end, the insertion end aligned with the assembly aperture in the outer shell.

19. The cooking appliance of claim 18, wherein the guide defines a plurality of hooks that are inserted into a plurality of slots defined by at least one of the inner shell or the outer shell, each of the hooks defining an insertion mouth that tapers inwardly towards a protrusion that extends towards the guide, each protrusion defining a rounded profile.

20. The cooking appliance of claim 18, wherein the lighting module includes at least one LED.

* * * * *